US008340903B2

(12) United States Patent
Dorfman

(10) Patent No.: US 8,340,903 B2
(45) Date of Patent: Dec. 25, 2012

(54) WAYFINDING SYSTEM

(76) Inventor: Bertrand Dorfman, New York, NY (US)

( * ) Notice: Subject to any disclaimer, the term of this patent is extended or adjusted under 35 U.S.C. 154(b) by 0 days.

(21) Appl. No.: 12/829,415

(22) Filed: Jul. 2, 2010

(65) Prior Publication Data

US 2010/0268455 A1 Oct. 21, 2010

Related U.S. Application Data

(63) Continuation of application No. 11/212,415, filed on Aug. 26, 2005.

(60) Provisional application No. 60/605,666, filed on Aug. 31, 2004.

(51) Int. Cl.
*G01C 21/00* (2006.01)

(52) U.S. Cl. ........ 701/434; 701/409; 701/433; 701/461; 340/995.11; 40/568; 40/569; 434/72

(58) Field of Classification Search .................. 701/200; 434/72
See application file for complete search history.

(56) References Cited

U.S. PATENT DOCUMENTS

| | | | | |
|---|---|---|---|---|
| 5,129,054 | A * | 7/1992 | Alstad et al. | 715/766 |
| 5,842,145 | A * | 11/1998 | Zimmer | 701/201 |
| 6,369,695 | B1 * | 4/2002 | Horon | 340/286.01 |
| 6,556,878 | B1 * | 4/2003 | Fielding | 700/83 |
| 6,604,126 | B2 * | 8/2003 | Neiman et al. | 709/203 |
| 6,675,091 | B2 * | 1/2004 | Navab | 701/517 |
| 6,728,636 | B2 * | 4/2004 | Kokojima et al. | 701/434 |
| 7,259,656 | B1 * | 8/2007 | Wright | 340/286.14 |
| 7,483,917 | B2 * | 1/2009 | Sullivan et al. | 1/1 |
| 2004/0103431 | A1 * | 5/2004 | Davenport et al. | 725/33 |
| 2005/0043933 | A1 * | 2/2005 | Rappaport et al. | 703/1 |
| 2006/0247849 | A1 * | 11/2006 | Mohsini et al. | 701/206 |

OTHER PUBLICATIONS

Protection Displays, "Protection Displays—Welcome," Protection Displays, 2003. [Online]. Available: http://web.archive.org/web/20030623154503/evacmaps.com/index.html. [Accessed: Sep. 11, 2010].*
Beland, "Evacuation Plans that Work^TM," halfbakery, 2003. [Online]. Available: http://web.archive.org/web/20031020205159/www.halfbakery.com/idea/Evacuation_20Plans_20that_20Work_5eTM. [Accessed: Sep. 11, 2010].*

* cited by examiner

*Primary Examiner* — Thomas Black
*Assistant Examiner* — Peter D Nolan
(74) *Attorney, Agent, or Firm* — Cowan, Leibowitz & Latman, P.C.; Lloyd McAulay, Esq.; Mark Montague, Esq.

(57) ABSTRACT

Disclosed is a system to provide optimum guidance for an individual seeking the destination point in a complex building. The system can be used for a range of individuals from firemen seeking an optimized and accurately mapped path from an access point at the entrance to the building to a destination point where a fire alarm has gone off or for a visitor in the museum who is seeking a path to a particular desired display destination. The system can provide multiple sequential simplified floor configuration maps. These maps are designed to show foreshortened walls so as to provide a three-dimensional maze-like format with the pathways visible and with a track mark illustrating an optimal path for the user to follow within the area shown on the map.

7 Claims, 2 Drawing Sheets

WAYFINDING SYSTEM

CROSS REFERENCE TO RELATED APPLICATION

This application is a continuation of U.S. patent application Ser. No. 11/212,415 filed on 26 Aug. 2005, which in turn claims priority to Provisional Application No. 60/605,666 filed on 31 Aug. 2004, in which the entire disclosures are incorporated herein by reference.

BACKGROUND OF THE INVENTION

The present invention relates to a system including a set of relevant maps and a method of producing the maps that facilitate having an individual find their way through a complex building structure from an access point, such as an entrance, to a destination point such as a room where a fire alarm has gone off or a room having a desired exhibition.

This invention relates to the method of implementing effective navigation between the point of entry and any other location or between any two locations in a complex building or network of buildings in a short period of time.

A typical situation to which this invention is addressed is one in which speedy, successful navigation is desired for police, fire or medical personnel during an emergency in an opera house, concert hall, or museum. In order to satisfy these requirements, a roadmap must be created to enable a first time visitor to quickly become sufficiently familiar with the structure so they may find the location of the emergency immediately.

In certain circumstances, floor plans of the building are available for examination; however, in a complex building it is almost impossible for anyone who is not intimately familiar with the building to successfully navigate to any particular location in a short period of time using these plans. The nature of complex buildings makes it difficult to read floor plan documentation, especially when viewed for the first time and thus makes it difficult to make effective use of this information. Emergency personnel are reduced to requiring hand-holding guidance to or from any point or area where they may be needed. The assistance is rarely available. If the situation worsens in the area of an emergency, the emergency personnel and those they are assisting may have great difficulty navigating and evacuating the building.

An alternate to the need to rely on difficult to read and understand floor plans and dependence on hand-holding guidance is the creation of an easy to read, understand and follow three-dimensional representation in a two-dimensional map intended to illustrate the specific route for the visitor to enable arriving at the intended destination quickly and without assistance.

A primary object of this invention is to provide a technique for facilitating the travel of an individual, such as a fireman, from an entry point in the building to a determined destination point.

A related purpose of this invention is to facilitate such travel from entry point to destination point along the most direct path and to provide guidance which will be the speediest, least confusing travel.

NOTES ON TERMINOLOGY

Perspective.

This term refers to any mode or technique of representing three dimensional objects and depth relationships on a two dimensional surface. For example, a perspective view may or may not be isometric. This provides a map which a typical individual would find easier to use in traversing the space shown than would a plan view.

Foreshortened.

This term is used to refer to the walls in a perspective view and to indicate that the walls are shown disproportionately low. The perspective view shows the floor and pathway over which the individual seeking access to the destination can travel.

Access Point.

This is a point which normally is located near an entrance to the building. There could be two or more access points. The term "access point" is used herein to include more than one access point.

Destination Point.

This refers to the room or area to which the individual using the maps of the system plans to go. It can be where a particular sensor, such as smoke alarm or fire alarm, generates a signal in response to the smoke or fire condition that the sensor is designed to detect. There are many destination points in the building. There may be more than one type of sensor employed. A signal may be received from only a single sensor at a single destination point. Where signals are received from multiple destination points, then multiple sets of maps will be generated at the access point.

The system can be used in other than emergency situations. The system can be used in, for example, a museum, to provide a visitor with a series of maps that serve as a walking guide to a particular designation room.

Sequential.

The three maps are denominated as sequential maps. This refers to the fact that they are employed in a particular sequence by an individual following the track indicated. They are not necessarily contiguous.

For example, the second map may start at the exit from a stairwell and the first map end is at the entrance to the same stairwell. The stairway between the entrance and exit point of the stairwell may or may not be shown on the maps.

As another example, the third sequentially used map is typically a larger scale view of a portion of the second map. The second map indicates either all or a substantial portion of the floor where the destination point exists. The third map represents a blown up or larger scale version of the zone around the destination point. The term sequential refers to a time of use relationship rather than a geometric continuity relationship.

Simplified Mapping.

The database that provides the maps of this invention will normally be derived from architectural and engineering drawings. These drawings contain a large number of representations that generate a degree of visual confusion for someone who wishes to rapidly run or walk between any two points shown on the drawings. Accordingly, as illustrated in the FIGS., almost all architectural drawing components are eliminated except for floors, walls and doorways. At certain places, stairs might be shown. On the simplified drawing, the pathway is preferably shown with a series of arrows in contrasting color trace.

BRIEF DESCRIPTION

In brief, this invention enables effective and rapid navigation of any building or network of buildings regardless of the level of complexity of the environment.

Upon arriving at a complex building, police, fire or emergency medical personnel can use a directory as part of an electronic display to call up the desired location and see the perspective presentation of a route to the desired floor and a horizontal presentation, including a denoted directional path, on the desired floor to the desired destination. There is no limit to the number of paths between any number of locations within the building or network of buildings.

By providing this capability, emergency personnel can accomplish their tasks in a faster and safer manner and general visitors can be made to feel more comfortable in an otherwise overly complicated and potentially hostile environment.

BRIEF DESCRIPTION OF THE FIGURES

FIG. 1 is a simplified perspective floor plan with foreshortened walls to provide a three-dimensional maze-like representation on a two-dimensional sheet.

FIG. 2 is a view, similar to that of FIG. 1, of the floor within which FIG. 1 is a portion. FIG. 2 is a much smaller scale than is FIG. 1.

DESCRIPTION OF THE PREFERRED EMBODIMENTS

Figure 1:
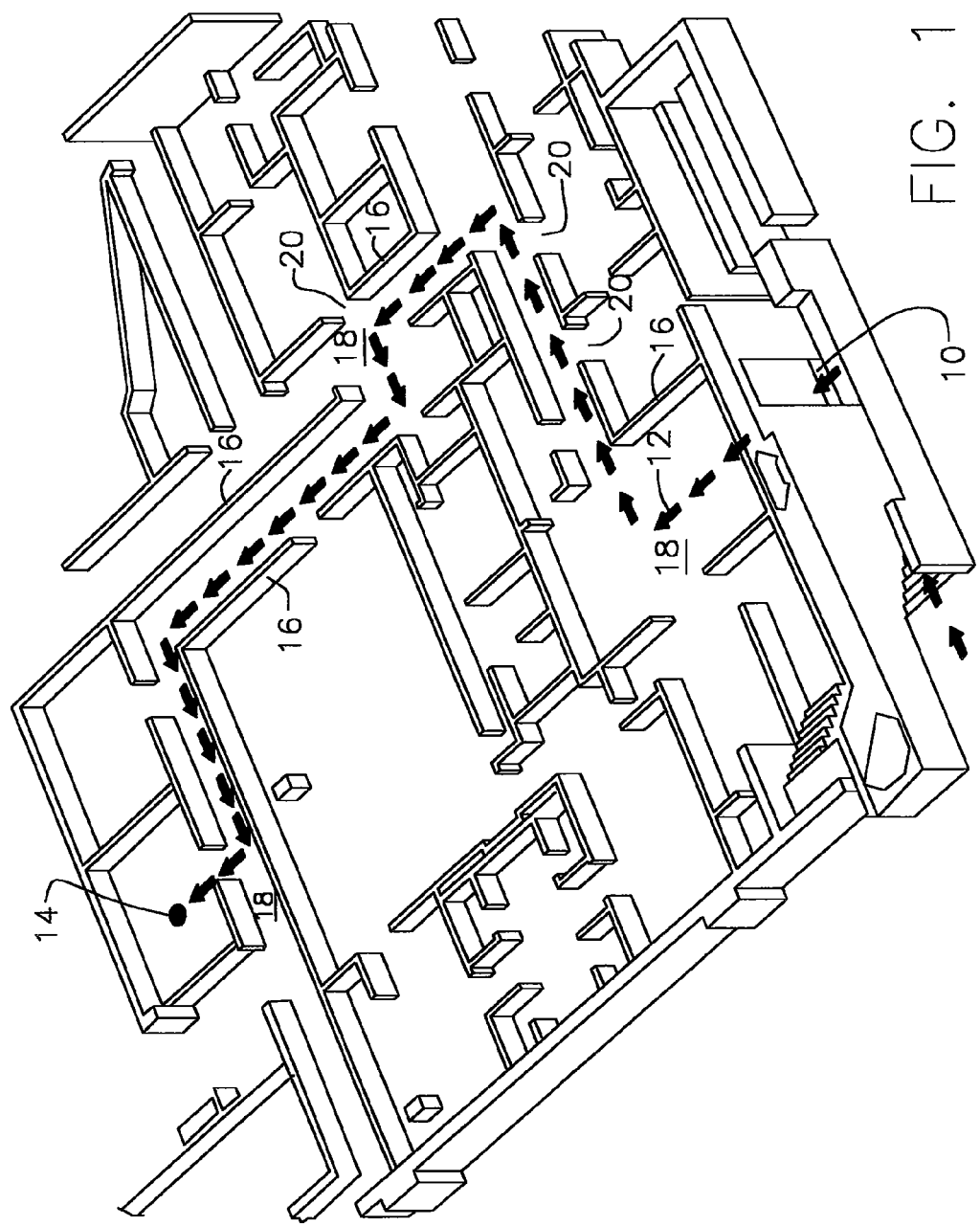
FIG. 1 illustrates the larger scale view of a portion of the floor near where the destination point is located.

FIG. 1 illustrates the type of perspective map employed in the system of this invention. An access point is shown at the entrance 10 which is down from a street level at a concourse level of a complex building. A set of arrows 12 show a preferred passageway through the building to a particular intermediate or final destination point 14. The walls 16 shown are illustrated in foreshortened format so as to provide a readily viewable presentation of the floor 18 and doorways 20. The doorways 20 are included because they provide significant breaks in the continuity of the walls. Showing doors and doorways avoids confusion by the user traveling along the hallways marked by the arrows 12.

Most other significant architectural features are omitted from the FIG. 1 drawing to provide the simplified representation that facilitates a person's travel along the pathway marked by the set of arrows 12.

Figure 2:
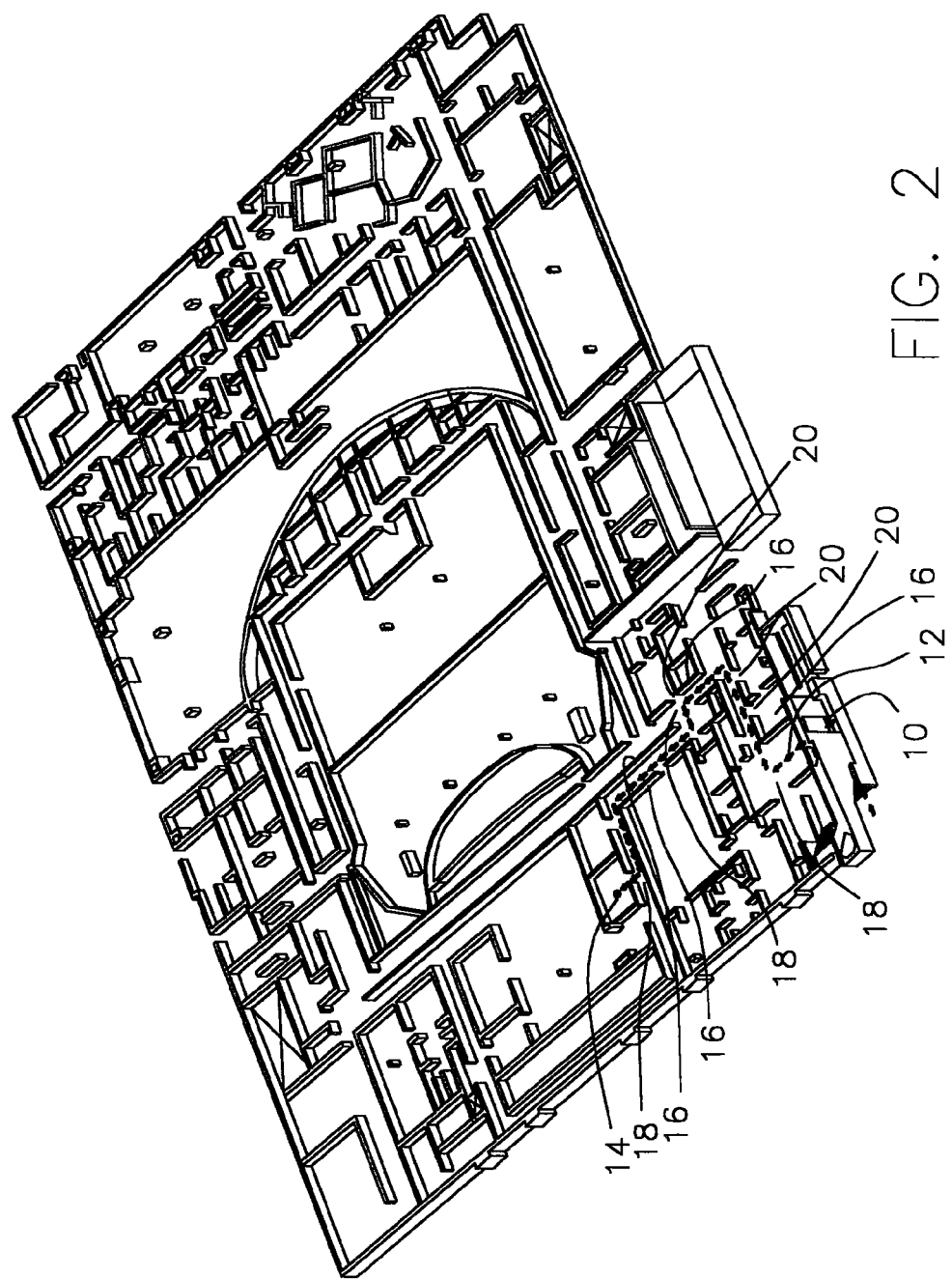

FIG. 2 illustrates a full floor picture of the floor for which FIG. 1 illustrates a larger scale at the lower left hand corner of FIG. 1. FIG. 2 illustrates the advantage of having a larger scale view of the area around the destination point. In large buildings, the scale can often be too small for ready traversal. Thus one or more larger scale views might be preferable.

The user of a maze-like representation, in which the walls are shown in a three-dimensional perspective above the floor, provides an image that makes it much easier for the typical user to move along the passageways quickly with confidence that the passageway involved corresponds to the passageway shown on the maze-like image. However, in order to show this wall on the image, the height of the wall on the image has to be kept low enough so that the wall does not block the passageway being shown.

In effect, the three-dimensional maze image on a two dimensional presentation mimics the actual three-dimensional maze with much foreshortened walls.

The invention can be adapted to provide passageway information between and through a complex of buildings as well as within a single complex building.

In one contemplated application of the invention, three consecutively used maps will be provided.

The first map will show a path from the access point to an inter-floor access such as a stairwell or elevator. That map may also show the stairwell. The stairwell may not be necessary in some cases.

The second map will show a path from the floor being accessed to the destination point. This will be a fairly small scale map covering much, if not all, of the floor in a large complex structure.

Accordingly, the third map will be a larger scale view of that portion of the second map which includes the destination point and thus provide an image and a pathway which can be more readily understood and followed by the user.

All three maps will show the optimized passageway for the user to follow. This optimized passageway will preferably be shown in a contrasting color overlaid with a series of arrows as shown in FIGS. 1 and 2.

The maps are simplified perspective views with foreshortened walls. They are prepared from architectural drawings by various techniques that are known in the art, including the use of autocad devices and axonometric rotation of images. These maps are held in the memory of a central processing unit (CPU).

When the user, such as a guard, enters the building at an accessed point, which is usually near an entranceway to the building, the three maps listed above are generated. They are then printed out on a printer at the access point and given to the individual, such as a fireman, to be used expeditiously to travel to a destination point.

In many cases, the destination point will be determined by a signal from a sensor at that destination point. The signal can be a fire alarm or smoke detector or intrusion alarm. In other cases, the destination point will be determined by virtue of where a visitor wishes to go. In all cases, the destination point is designated by an appropriate code which corresponds to that point in the map to be generated. In that fashion, the CPU selects the appropriate series of maps from the access point to that particular destination point.

While the foregoing description and drawings represent the presently preferred embodiments of the invention, it should be understood that those skilled in the art will be able to make changes and modifications to those embodiments without departing from the teachings of the invention and the scope of the claims.

What is claimed is:

1. In a complex building having a plurality of predetermined location points, a system for optimally guiding an individual between any two of said location points, one being a starting point and the second being a destination point, comprising:

simplified floor configuration maps in a three-dimensional maze like format illustrating one or more predetermined paths between any selected starting point and any selected destination point within the building, said maps each providing a perspective view in which walls are represented in foreshortened form to avoid blocking floor representation, said maps providing a track mark illustrating that portion of the predetermined path between said starting and destination points that is within the area illustrated in the maps, said maps each derived from an axonometric rotation of architectural drawings, said axonometric rotation thereby providing a predetermined optimal image of the area illustrated in the maps, a first one of said maps showing a path from a starting point to an inter-floor access, a second one of said maps showing a path from an inter-floor access to a destination point, a third one of said maps providing a larger scale view of a portion of said second map, said portion including the destination point, a plurality of sensors at a plurality of said destination points, and a CPU having a predetermined map database, said CPU being coupled to each of said sensors and programmed to respond to a signal from a sensor to generate a predetermined optimum path to the destination point at which said sensor is located.

2. The system of claim 1 further comprising: a printer coupled to said CPU to print out said maps.

3. The system of claim 1 wherein: the destination point is derived from an alarm signal.

4. The system of claim 1 wherein: the starting point is positioned near an entrance to the building.

5. The system of claim 1 wherein: said inter-floor access is a flight of stairs, and wherein: an entry point to said flight of stairs is mapped on said first map; an exit point from said flight of stairs is mapped on said second map and said flight of stairs is omitted from said maps.

6. A method of providing passageway information from a starting point to a destination point in a complex building comprising a plurality of sensors associated with a plurality of destination points, the method comprising the steps of:

from architectural drawings, providing, in a processor, multiple simplified maze-like sequential maps in three-dimensional perspective of the passageway configurations within the building, detecting a signal from a sensor of said plurality of sensors, providing a tracking line on each of said maps along the passageways that lead from an starting point to a destination point associated with said sensor, and deriving an optimal presentation of each map by axonometric rotation within said processor of said maze like maps having said tracking line, providing a predetermined map database in a CPU containing the optimum path from the access point in the building to each of the destination points, and generating one or more simplified floor configuration maps in a three-dimensional maze-like format illustrating zones from the access point to the destination point, each of said maps providing a perspective view in which walls are represented in foreshortened form to avoid blocking the floor representation, each of said maps providing a track mark illustrating an optimal path within the zone illustrated in the map, each of said maps derived from an axonometric rotation of said perspective views to provide an optimal image of the zone illustrated in the maps.

7. The method of claim 6 further comprising the step of: printing one or more of said plurality of maps.

* * * * *